(12) United States Patent
Kato et al.

(10) Patent No.: US 8,157,332 B2
(45) Date of Patent: Apr. 17, 2012

(54) CONTROL DEVICE FOR A BRAKE APPARATUS

(75) Inventors: Tomohiro Kato, Toyohashi (JP); Masanobu Yamaguchi, Okazaki (JP); Koichi Tomida, Toyota (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 350 days.

(21) Appl. No.: 12/613,106

(22) Filed: Nov. 5, 2009

(65) Prior Publication Data
US 2010/0117445 A1    May 13, 2010

(30) Foreign Application Priority Data
Nov. 13, 2008  (JP) .................................. 2008-290726

(51) Int. Cl.
*B60T 8/34* (2006.01)
(52) U.S. Cl. ..................................... 303/114.1; 60/547.1
(58) Field of Classification Search .................... 303/10, 303/11, 113.1, 113.4, 114.1, 114.3; 60/547.1, 60/550; 188/151 R, 152
See application file for complete search history.

(56) References Cited

U.S. PATENT DOCUMENTS
6,322,164 B1    11/2001    Sakamoto et al.

FOREIGN PATENT DOCUMENTS
JP    11-020670 A    1/1999
JP    11-20671 A    1/1999

OTHER PUBLICATIONS
U.S. Appl. No. 12/633,604, filed Dec. 8, 2009, Kato, et al.

*Primary Examiner* — Christopher Schwartz
(74) *Attorney, Agent, or Firm* — Buchanan Ingersoll & Rooney PC

(57) ABSTRACT

The control device adapted to a vehicle brake apparatus includes a vacuum obtaining portion, a master cylinder pressure obtaining portion and a boosting control portion for executing a boosting control which controls supplying of a boosting pressure established by driving the hydraulic pressure pump and controlling the pressure differential control valve so that the boosting pressure agrees to a target boosting pressure obtained with a target boosting gain smaller than a basic boosting gain which indicates a servo-ratio of the vacuum booster up to the time, when the master cylinder pressure becomes equal to or more than a boosting limit pressure which is a master cylinder pressure corresponding to a boosting limit of the vacuum booster at the vacuum obtained by the vacuum pressure obtaining portion, in addition to the master cylinder pressure established in response to the operation of the brake operation member.

6 Claims, 12 Drawing Sheets

CONTROL DEVICE FOR A BRAKE APPARATUS

This application is based on and claims priority under 35 U.S.C. §119 to Japanese Patent Application 2008-290726, filed on Nov. 13, 2008, the entire content of which is incorporated herein by reference.

FIELD OF THE INVENTION

The present invention relates to a control device for a brake apparatus.

BACKGROUND

As an example of a conventional art, a patent document (Japanese patent No. 1999-20671A) discloses a control device adapted for a brake apparatus, in which at step S4 (see FIG. 6 of the patent document), whether a vacuum brake booster 12 is in a boosting limit state or not, is judged. If the control device judges that the booster 12 is in the boosting limit state, a pressure increase control is initiated (steps S8 to S13). In more detail, the control device actuates a pump 112 and generates a hydraulic pressure higher than a master cylinder pressure $P_M$ by a pressure difference $\Delta P$ and supplies the generated hydraulic pressure to a brake cylinder 50 during braking operation. Thus, the control device controls a pressure increase gradient (inclination) to be constant irrespectively of the booster 12 being during the time period before or after the boosting limit state. The pressure increase gradient indicates a gradient of a rate of change with time of a brake cylinder pressure $P_B$. (Reference numerals and symbols described above are shown in FIG. 6 or FIG. 1 in the patent document, i.e., Japanese patent No. 1999-20671A).

In the conventional control device shown in the patent document is structured to judge whether the vacuum brake booster 12 is in the state of boosting limit based on a booster pressure signal from a booster pressure switch 304. This structure has a drawback that the pump 112 may be erroneously operated even when the vacuum booster 12 has actually not reached the boosting limit state due to a detection deviation of the booster pressure switch 304, or a mechanical deviation of the booster 12. Such erroneous operation may lead to insufficient exertion of a desired braking performance.

Need thus exists for a control device adapted for a brake apparatus which is not susceptible to the drawbacks mentioned above.

SUMMARY OF THE INVENTION

The control device adapted to a vehicle brake apparatus (A) equipped with a master cylinder for establishing a hydraulic brake pressure in response to an operation of a brake operation member, a vacuum booster boosting an operation force of the brake operation member by using a vacuum supplied thereto and outputting a boosting force to the master cylinder, a wheel cylinder applying a braking force to a wheel of a vehicle upon supply of the hydraulic brake pressure from the master cylinder, a pressure differential control valve provided in a hydraulic pressure passage connecting the master cylinder and the wheel cylinder for controlling a wheel cylinder side hydraulic pressure to be higher than a master cylinder side hydraulic pressure by a controlled pressure differential amount, a hydraulic pressure pump connected to the hydraulic pressure passage connecting the master cylinder and the wheel cylinder for establishing a hydraulic brake pressure upon receipt of an output from an electric motor and supplying the established hydraulic brake pressure to the wheel cylinder, independently of the hydraulic brake pressure established by the master cylinder, a vacuum detecting means for detecting the vacuum supplied to the vacuum booster and a master cylinder pressure detecting means for detecting the master cylinder pressure. The control device according to the invention includes a vacuum pressure obtaining means obtaining the vacuum supplied to the vacuum booster by means of the vacuum detecting means, a master cylinder pressure obtaining means for obtaining the master cylinder pressure by means of the master cylinder pressure detecting means and a boosting control means establishing a boosting pressure as an additional hydraulic brake pressure and supplying the boosting pressure to the wheel cylinder, in addition to the master cylinder pressure established in response to the operation of the brake operation member. The hydraulic pressure pump and the pressure differential control valve are controlled from the time when the master cylinder pressure obtained by the master cylinder pressure obtaining means has reached a value equal to or more than a boosting limit pressure which is a master cylinder pressure corresponding to a boosting limit of the vacuum booster at the vacuum obtained by the vacuum, pressure obtaining means so that the boosting pressure agrees to a target boosting pressure obtained with a target boosting gain which is smaller than a basic boosting gain corresponding to a servo-ratio of the vacuum booster for a period until the booster reaches the boosting limit.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
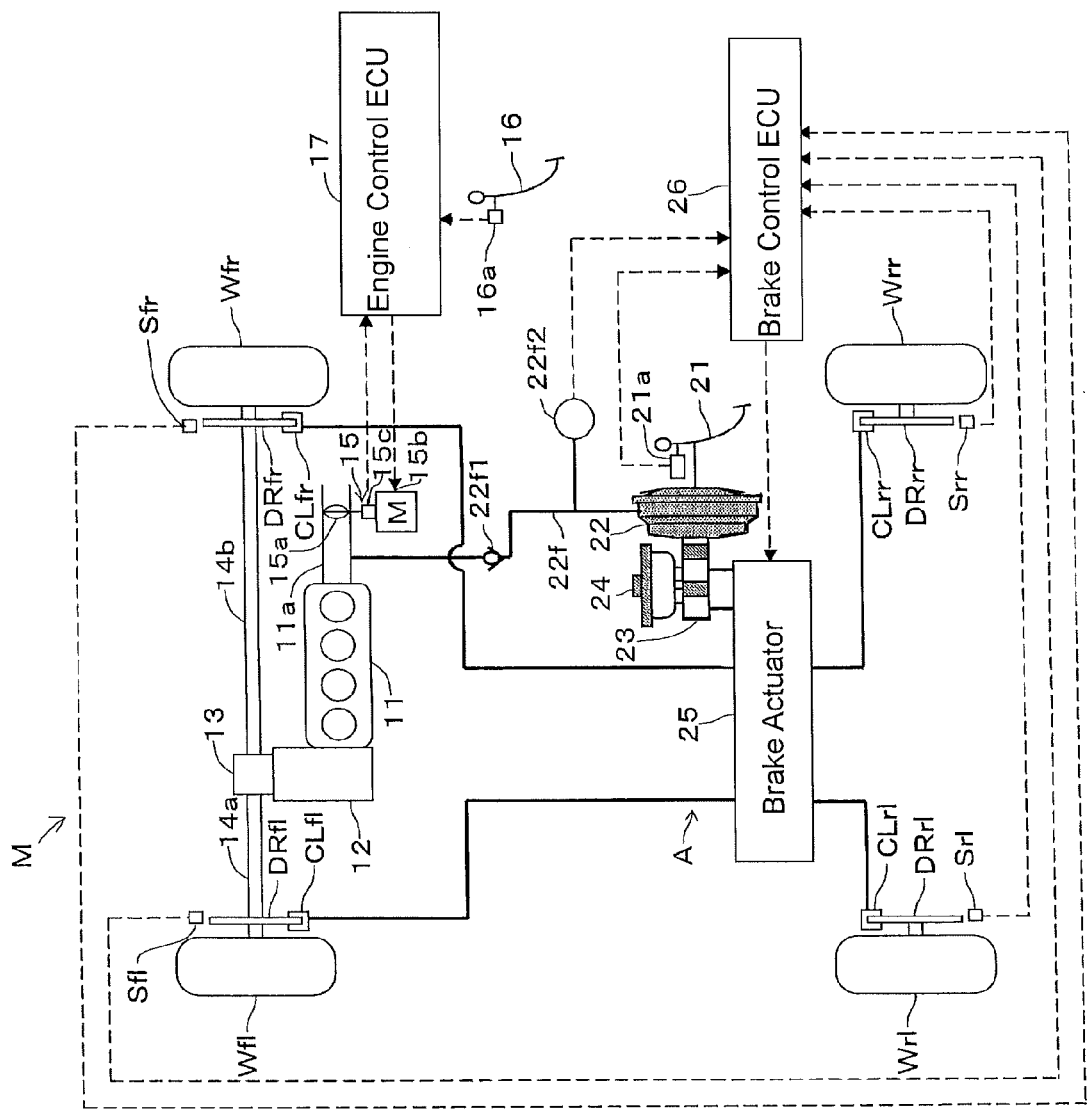
FIG. 1 is a schematic view of a vehicle to which an embodiment of a control device of a hydraulic brake apparatus according to the invention is adapted.
Figure 2:
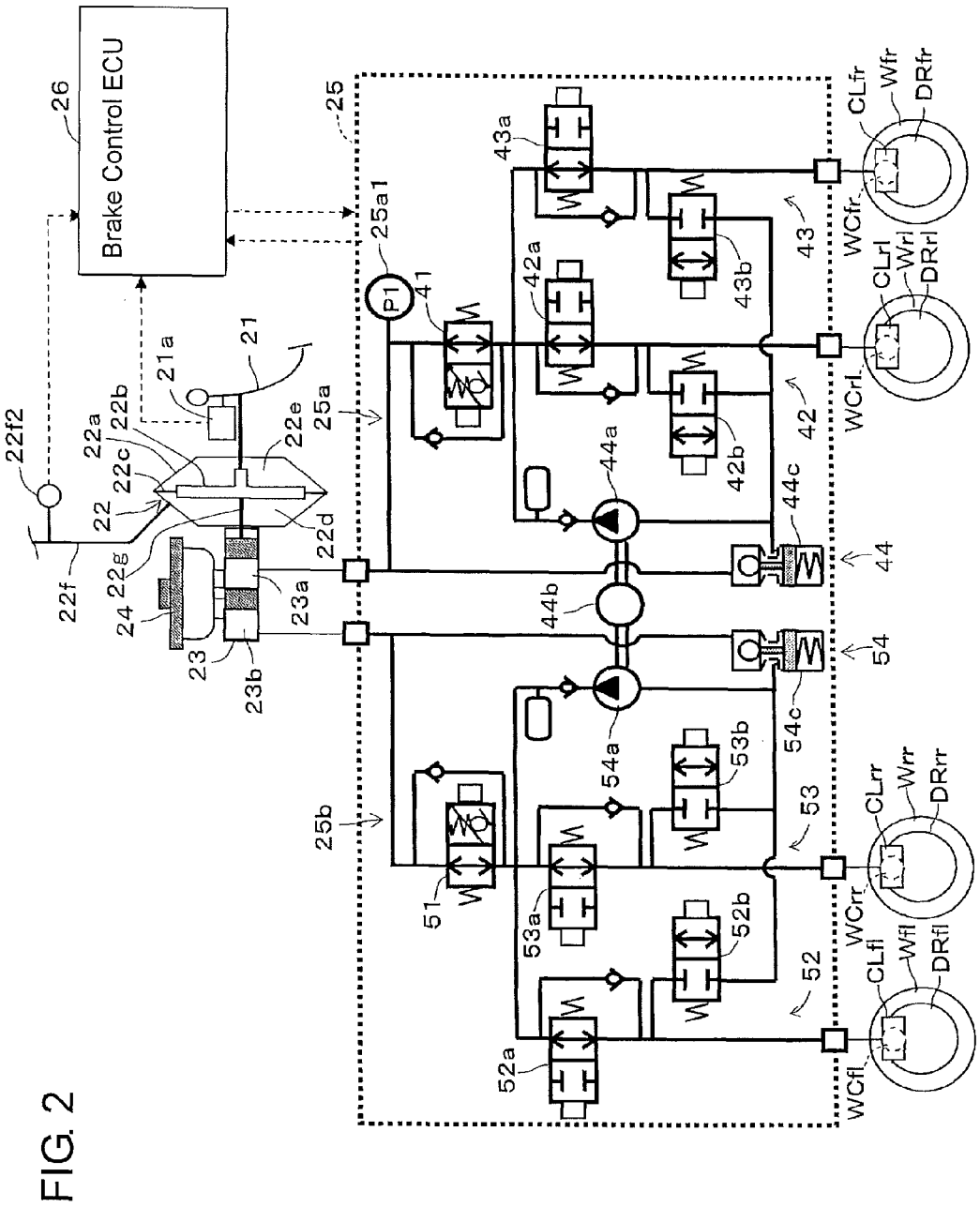
FIG. 2 is a schematic view of a structure of the hydraulic brake apparatus shown in FIG. 1.

Embodiments of the invention will be explained hereinafter with the reference to the attached drawings. The control device according to the invention is adapted to a vehicle brake apparatus. FIG. 1 shows a schematic view of the vehicle structure in which the control device is adapted to the hydraulic brake apparatus. FIG. 2 shows a structure of the hydraulic brake apparatus shown in FIG. 1, wherein the vehicle M indicates a front wheel drive type vehicle and a driving force of an engine 11 installed in the vehicle front as a driving source is transmitted to the front wheels (not to the rear wheels). However, the control device for the hydraulic brake apparatus can be adapted to any other type vehicles, such as, for example, a rear wheel drive vehicle or a four-wheel drive type vehicle.

The vehicle M includes the engine 11, a transmission 12, a differential gear 13 and a left drive shaft 14a and a right drive shaft 14b. The driving force from the engine 11 is transmitted to a front left wheel Wfl and a front right wheel Wfr through the transmission 12, differential gear 13 and the left and right drive shafts 14a and 14b, respectively. The engine 11 includes an intake pipe 11a through which the air flows into an engine combustion chamber (not shown). A throttle valve 15a is provided in the intake pipe 11a for adjustably controlling the air flow rate flowing through the pipe 11a.

The throttle valve 15a used in this vehicle M is electronically controlled type throttle valve and is not a type that is mechanically connected to an accelerator pedal 16 through a wire. In other words, the throttle valve 15a is controlled to be open or closed by an actuation of a motor 15b upon receipt of a command signal from an engine control ECU 17. The throttle opening degree is detected by a throttle opening degree sensor 15c and the detected signal is sent to the engine control ECU 17 for feedback controlling. Basically, the engine control ECU 17 receives a signal corresponding to the accelerator pedal depression amount, which is detected by an accelerator depression degree detecting sensor 16a and sends a command signal to the motor 15b. The command signal from the ECU 17 corresponds to the opening degree of the throttle valve 15a in response to the pedal depression amount. Further, the engine control ECU 17 receives a signal indicating an engine condition and the ECU 17 decides a command value corresponding to the throttle opening degree. The detected engine condition has been considered upon deciding the command value.

The transmission 12 is an automatic transmission which outputs driving force from the engine 11 to the drive side wheels (in this embodiment, wheels Wfl, Wfr) by changing the speed. The transmission 12 includes multi-forward gears, for example, four forward speeds and one reverse speed. The transmission 12 performs speed gear change within the driver's selected gear speed range based on the vehicle load and vehicle speed.

The vehicle M is equipped with a hydraulic pressure brake apparatus (brake apparatus) A for braking (stopping) the vehicle. The hydraulic pressure brake apparatus A includes wheel cylinders WCfl, WCfr, WCrl and WCrr (FIG. 2) at each wheel, a brake pedal 21 (a brake operation member), a vacuum booster 22, a master cylinder 23, a reservoir tank 24, a brake actuator 25 (a hydraulic pressure automatically generating device) and a brake control ECU 26 (control device) for the brake apparatus.

Each wheel cylinder WCfl, WCfr, WCrl and WCrr restricts the rotation of each corresponding wheel Wfl, Wfr, Wrl and Wrr and each cylinder is provided in each brake caliper CLfl, CLfr, CLrl and CLrr. When a basic hydraulic pressure (first hydraulic pressure), an auxiliary hydraulic pressure (second hydraulic pressure) or a controlled hydraulic pressure (third hydraulic pressure) is supplied to each wheel brake cylinder WCfl, WCfr, WCrl and WCrr, each piston (not shown in Figure) to be disposed in each wheel cylinder is moved in the cylinder to push a pair of brake pads (friction materials) thereby to press each disc rotor (rotation member) DRfl, DRfr, DRrl and DRrr integrally rotating with each wheel Wfl, Wfr, Wrl and Wrr from both sides to stop the rotation of the wheel. The wheel cylinder shown in FIG. 2 is a disc type wheel brake cylinder, but a drum type wheel brake cylinder may be adapted.

The vacuum booster 22 assists a braking operation to establish an auxiliary hydraulic pressure (pressure generated by the force of the power piston) by boosting the operation force generated by the depression of the brake pedal 21 in response to the pedal operation force by using a vacuum pressure from the engine 11 (vacuum pressure supply device). The established auxiliary hydraulic pressure is supplied to the wheel brake cylinders WCfl, WCfr, WCrl and WCrr to generate a second friction brake force at each wheel Wfl, Wfr, Wrl and Wrr.

In more detail, the vacuum brake booster 22 includes a power cylinder 22a or housing, a power piston 22b disposed in the power cylinder 22a and reciprocal therein, a diaphragm 22c disposed in the power cylinder 22a between the power piston 22b and the power cylinder 22a, a vacuum chamber 22d and an atmospheric pressure chamber 22e. The power piston 22b and the diaphragm 22c are disposed in the power cylinder 22a and divide the inside of the cylinder 22a into the vacuum chamber 22d and the atmospheric pressure chamber 22e. The vacuum chamber 22d is in fluid communication with the engine intake pipe 11a through a connecting pipe 22f for supplying vacuum from the engine. The atmospheric pressure chamber 22e is selectively open to the atmosphere to introduce air into the atmospheric chamber 22e. When the atmospheric pressure chamber 22e is open to the air, due to the pressure differential between the chambers 22d and 22e (pressure difference between vacuum pressure and the atmospheric pressure), the power piston 22b moves to the left as viewed in FIG. 2 to push a push rod 22g connected to the power piston 22b. Then, pistons in the master cylinder 23 are in turn moved to the left as viewed in FIG. 2 to achieve a brake boosting operation. A check valve 22f1 (see FIG. 1) is interposed in the connecting pipe 22f to allow a fluid flow only in one direction (from the vacuum chamber 22d side to the engine intake pipe 11a side) and to restrict the fluid flow in the other direction (from the intake pipe side to the vacuum chamber side).

The hydraulic pressure brake apparatus A (FIG. 1) includes a vacuum sensor 22f2 (vacuum detecting means) for detecting a vacuum pressure level in the intake pipe 11a of the engine 11, i.e., vacuum in the connecting pipe 22f. The sensor 22f2 sends a signal indicating the detected vacuum pressure to the brake control ECU 26.

The master cylinder 23 supplies hydraulic pressure (basic hydraulic pressure+auxiliary hydraulic pressure) to each wheel brake cylinder WCfl, WCfr, WCrl and WCrr. In other words, the master cylinder 23 inputs a total force of brake operation force (pedal depression force by the driver) and a power piston 22b force of the vacuum booster 22 resulted from the pedal operation. The total force is a resultant force of pedal depression force and the boosting brake operation force boosted by the vacuum booster. The master cylinder 23 outputs the hydraulic pressure (basic hydraulic pressure and the auxiliary hydraulic pressure) by converting the inputted force into hydraulic pressure. The basic hydraulic pressure is a pressure component established by the brake pedal 21 depression force, whereas the auxiliary hydraulic pressure is a pressure component established by a force generated by the movement of the power piston 2b of the brake booster 22. The first friction brake force is generated at the wheels Wfl, Wfr, Wrl and Wrr by the basic hydraulic pressure.

The reservoir tank 24 reserves therein a brake fluid for supplying the fluid to the master cylinder 23.

A brake actuator 25 is disposed in a brake fluid passage between the master cylinder 23 and each wheel cylinder WCfl, WCfr, WCrl and WCrr and supplies a control hydraulic pressure to the wheel cylinders WCfl, WCfr, WCrl and WCrr which is independently established irrespective of the brake pedal depression. The third friction brake force is generated at the corresponding wheels Wfl, Wfr, Wrl and Wrr by the control hydraulic pressure established by the brake actuator 25.

The brake actuator 25 will be explained in more detail with reference to FIG. 2. The brake actuator 25 is formed by a plurality of independently operated hydraulic pressure circuits (brake systems). More specifically, the brake actuator 25 includes a first brake circuit 25a and a second brake circuit 25b, each circuit being formed with a diagonal piping. In other words, the first brake circuit 25a hydraulically connects a first hydraulic pressure chamber 23a of the master cylinder 23 with the rear left wheel cylinder WCrl at the rear left wheel MI and the front right wheel cylinder WCfr at the front right wheel Wfr, for braking the diagonally positioned two wheels. The other brake circuit 25b hydraulically connects a second hydraulic chamber 23b of the master cylinder 23 with the front left wheel cylinder WCfl at the front left wheel Wfl and the rear right wheel cylinder WCrr at the rear right wheel Wrr for braking the other diagonally positioned two wheels.

The first brake circuit (first brake system) 25a includes a pressure differential control valve 41, a rear left wheel pressure control portion 42, a front right wheel pressure control portion 43 and a first pressure decrease portion 44.

The pressure differential control valve 41 is a normal open type linear electro-magnetic valve disposed between the master cylinder 23 and an upstream side of the rear left wheel pressure control portion 42 and an upstream side of the front right wheel pressure control portion 43. This pressure differential control valve 41 is open/close controlled by the brake control ECU 26. The condition shown in FIG. 2 indicates a non-pressure differential condition (no pressure differential is generated). When the pressure differential control valve 41 is energized to close the communication between the master cylinder 23 and the wheel cylinders WCrl and WCfr (pressure differential condition is generated), the hydraulic pressure at the wheel cylinder side can be kept higher than the master cylinder pressure by a predetermined controlled pressure differential. This predetermined controlled pressure differential value can be adjusted in response to the controlled electric current from the brake control ECU 26. Thus, the controlled hydraulic brake pressure can be established, which corresponds to the controlled pressure differential with the pressure increase by driving the pump 44a (and 54a).

The rear left wheel pressure control portion 42 controls brake pressure supply to the rear left wheel cylinder WCrl and includes a pressure increase valve 42a which is a two-port, two-position switching type normal open electro-magnetic open/close valve and a pressure decrease valve 42b which is a two-port, two-position switching type normal close electro-magnetic open/close valve. The pressure increase valve 42a is disposed between the pressure differential control valve 41 and the rear left wheel cylinder WCrl to establish or interrupt fluid communication between the pressure differential control valve 41 and the wheel cylinder WCrl in response to a command signal from the brake control ECU 26. The pressure decrease valve 42b is disposed between the wheel cylinder WCrl and a pressure regulating reservoir 44c to establish or interrupt fluid communication between the wheel cylinder WCrl and the pressure regulating reservoir 44c in response to a command signal from the brake control ECU 26. Accordingly, the pressure in the rear left wheel cylinder WCrl can be controlled to increase, maintain or decrease.

The front right hydraulic pressure control portion 43 controls brake pressure supply to the front right wheel cylinder WCfr and includes a pressure increase valve 43a and a pressure decrease valve 43b. These valves 43a and 43b are controlled by the brake control ECU 26 to increase, maintain or decrease the pressure in the front right wheel cylinder WCfr.

The first pressure decrease portion 44 includes the pump 44a (oil pump), a motor 44b for the pump 44a and a pressure regulating reservoir 44c. The pump 44a pumps up the brake fluid in the pressure regulating reservoir 44c and supplies the fluid to the fluid passage between the pressure differential control valve 41 and the pressure increase valves 42a and 43a. The pump 44a is driven by the motor 44b which is driven in response to a command from the brake control ECU 26.

The pressure regulating reservoir 44c temporally reserves brake fluid returned from the wheel cylinders WCrl and WCfr through the pressure decrease valves 42b and 43b. The pressure regulating reservoir 44c directly in communication with the master cylinder 23 and the master cylinder 23 supplies the brake fluid to the reservoir 44c when the fluid in the reservoir 44c is under a predetermined level and stops the supply when the fluid therein is in the predetermined level.

The pressure differential condition can be established by the pressure differential control valve 41. When the pump 44a is driven to perform vehicle stability control, traction control or other brake control, the brake fluid from the master cylinder 23 can be supplied to the upstream side of the pressure increase valves 42a and 43a through the pressure regulating reservoir 44c.

The second brake circuit (second brake system) 25b includes a pressure differential control valve 51, the front left wheel hydraulic pressure control portion 52, the rear right wheel hydraulic pressure control portion 53 and a second pressure decrease portion 54.

The pressure differential control valve 51 is a normal open type linear electro-magnetic valve disposed between the master cylinder 23 and an upstream side of the front left wheel pressure control portion 52 and an upstream side of the rear right wheel pressure control portion 53. This pressure differential control valve 51 is controlled by the brake control ECU 26 to keep the brake pressure in the wheel brake cylinder WCfl and WCrr side higher than that in the master cylinder 23 side by a predetermined pressure difference.

The front left wheel pressure control portion 52 and the rear right wheel pressure control portion 53 control brake pressure supply to the front left wheel cylinder WCfl and the rear right wheel cylinder WCrr and each control portion 52, 53 includes a pressure increase valve 52a, 53a and a pressure decrease valve 52b, 53b, as similar to the rear left and front right control portions 42, 43. The pressure increase valves 52a, 53a and the pressure decease valves 52b, 53b establish or interrupt fluid communication between the pressure differential control valve 51 and the wheel cylinder WCfl and WCrr in response to a command signal from the brake control ECU 26. Accordingly, the hydraulic pressures in the front left wheel cylinder WCfl and rear right wheel cylinder WCrr can be controlled to be increased, to be maintained or to be decreased.

The second pressure decrease portion 54 includes the pump 54a (oil pump), the motor 44b (commonly used with the first pressure decrease portion 44) for the pumps 54a and a pressure regulating reservoir 54c. The pump 54a pumps up the brake fluid in the pressure regulating reservoir 54c and supplies the fluid to the fluid passage between the pressure differential control valve 51 and the pressure increase valves 52a and 53a. The pump 54a is driven by the motor 44b which is driven in response to a command from the brake control ECU 26.

According to the structure of the brake actuator 25, under normal braking operation, all electro-magnetic valves are non-energized (condition shown in FIG. 2) and brake pressure is generated and supplied to each wheel cylinder WCfl, WCrr, WCrl and WCfr. This brake pressure is the total of basic hydraulic pressure and the auxiliary hydraulic pressure in response to the brake pedal depression force. It should be noted here that suffixes fl, fr, rl and rr indicate front left, front right, rear left and rear right positions of the vehicle wheels with respect to the vehicle body.

When the brake actuator 25 drives motor 44b, and accordingly, the pumps 44a and 54a and at the same time, energizes the pressure differential control valves 41 and 51, the control hydraulic brake pressure in addition to the hydraulic pressure from the master cylinder 23 (basic hydraulic pressure+auxiliary hydraulic pressure) is supplied to each wheel cylinder WC. Suffix "" indicates any one of fl fr, rl and rr, and "fl" is the abbreviation for front left, "fr" for front right, "rl" for rear left and "rr" for rear right.

Further, the brake actuator 25 controls the pressure increase valves 42a, 43a, 52a and 53a and the pressure decrease valves 42b, 43b, 52b and 53b to independently adjust the brake pressure in any of the wheel brake cylinder WC**, and accordingly, many vehicle behavioral controls can be realized, such as, anti-skid control, front/rear wheel brake distribution control, vehicle stability control (under steer restriction control, over steer restriction control), traction control, inter-vehicular distance control upon receipt of command from the brake control ECU 26.

The brake actuator 25 further includes a pressure sensor 25a1 (master cylinder pressure detecting means) for detecting a master cylinder 23 pressure. The sensor detects the master cylinder pressure and sends a detecting signal to the brake control ECU 26. In this embodiment of the invention, the pressure sensor 25a1 is disposed in a fluid passage between the master cylinder 23 and the pressure differential control valve 41 in the first brake circuit 25a, however the master cylinder pressure sensor may be provided in the fluid passage in the second brake circuit 25b.

The hydraulic pressure brake apparatus A includes a brake pedal stroke sensor 21a (brake operation condition detecting means) for detecting a stroke amount of the brake pedal 21 as shown in FIG. 1 and FIG. 2. The pedal stroke sensor detects the stroke amount of the brake pedal and sends a detecting signal to the brake control ECU 26. The stroke amount of the brake pedal 21 corresponds to the operation condition of the brake pedal 21. The brake pedal stroke sensor 21a corresponds to brake operation condition detecting means.

As shown in FIG. 1, the hydraulic pressure brake apparatus A includes a vehicle wheel speed sensor Sfl, Sfr, Srl and Srr which are respectively mounted in the vicinity of the corresponding wheel Wfl, Wfr, Wrl and Wrr. The vehicle wheel speed sensor S detects rotation speed of each wheel W and sends a pulse signal with a frequency corresponding to the rotation speed to the brake control ECU 26.

The brake control ECU 26 includes a microprocessor (not shown) and the microprocessor includes input/output interface, CPU, RAM and ROM (all, not shown) connected thereto with bus lines (not shown). The CPU executes the program according to the flowchart shown in FIGS. 11 through 14, wherein when the vacuum supplied to the vacuum booster 22 is insufficient to perform a predetermined braking force, the CPU controls the brake actuator 25 to compensate for the deficiency and supplies a target brake pressure to the wheel cylinder WC** corresponding to the brake pedal depression force.

Figure 3:
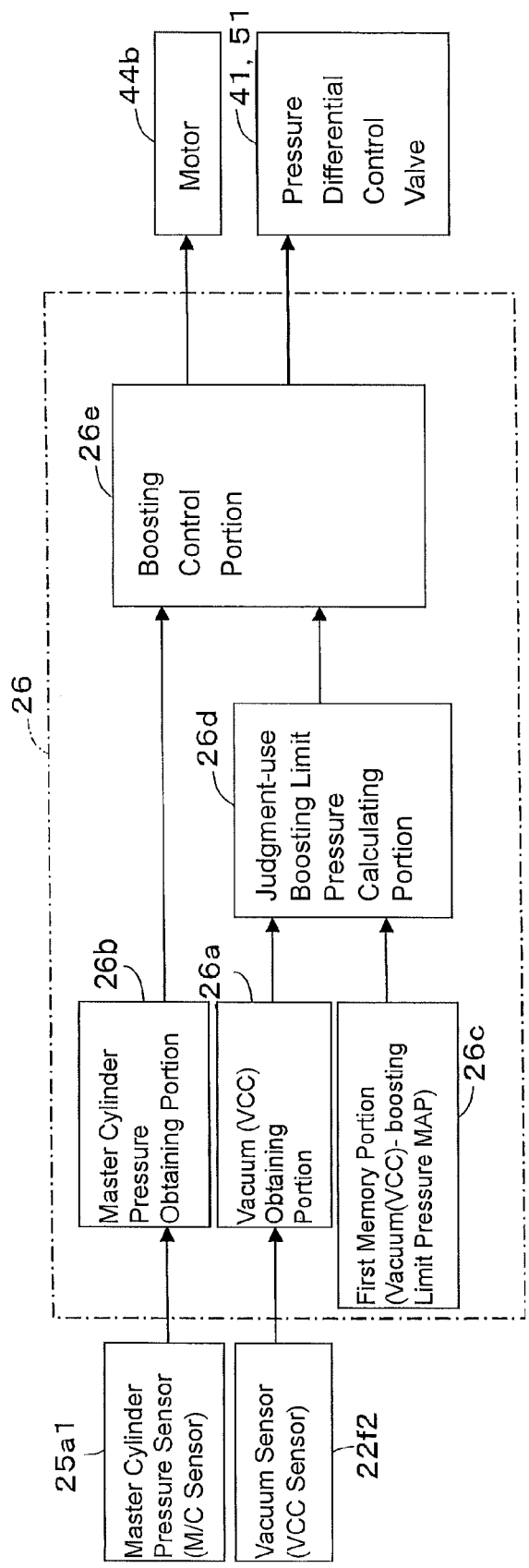
FIG. 3 is a control block diagram showing the structure of the control device shown in FIG. 1 and FIG. 2.

The brake control ECU 26 is a control device for controlling the hydraulic pressure brake apparatus A. In FIG. 3, The brake control ECU 26 includes a vacuum obtaining portion (vacuum obtaining means) 26a for obtaining vacuum pressure supplied to the vacuum booster 22 based on the detecting signal from the vacuum sensor (Vcc sensor) 22f2, a master cylinder pressure obtaining portion (master cylinder pressure obtaining means) 26b for obtaining hydraulic pressure in the master cylinder 23 based on the master cylinder pressure sensor (M/C pressure sensor) 25a1 and a first memory portion (first memory means) 26c memorizing therein a vacuum-boosting limit pressure map indicating a relationship between randomly indicated vacuum pressure levels each supplied from the engine to the vacuum booster 22 and the boosting limit pressure at each vacuum level corresponding to the master cylinder pressure which corresponds to the boosting limit of the vacuum booster 22 at the vacuum level.

Figure 5:
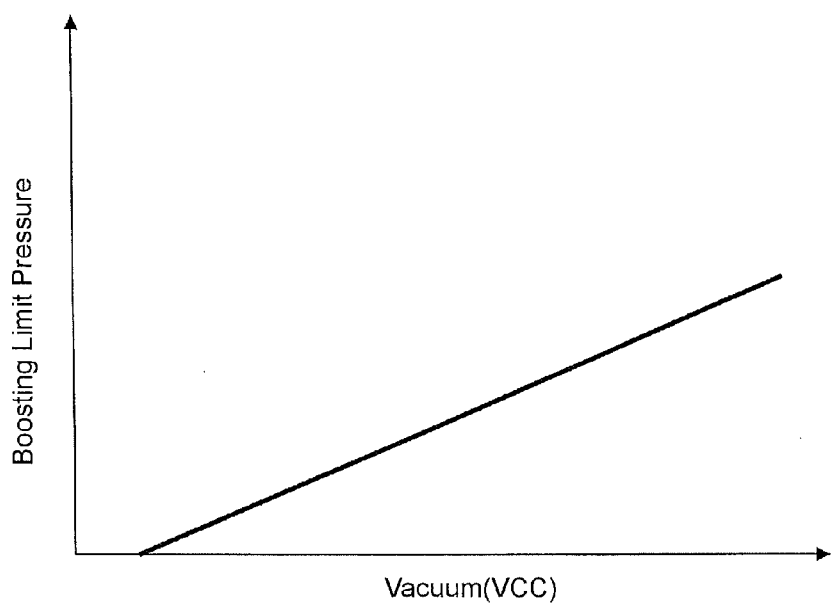
FIG. 5 is a graph showing a vacuum-boosting limit pressure map (initial map)
Figure 6:
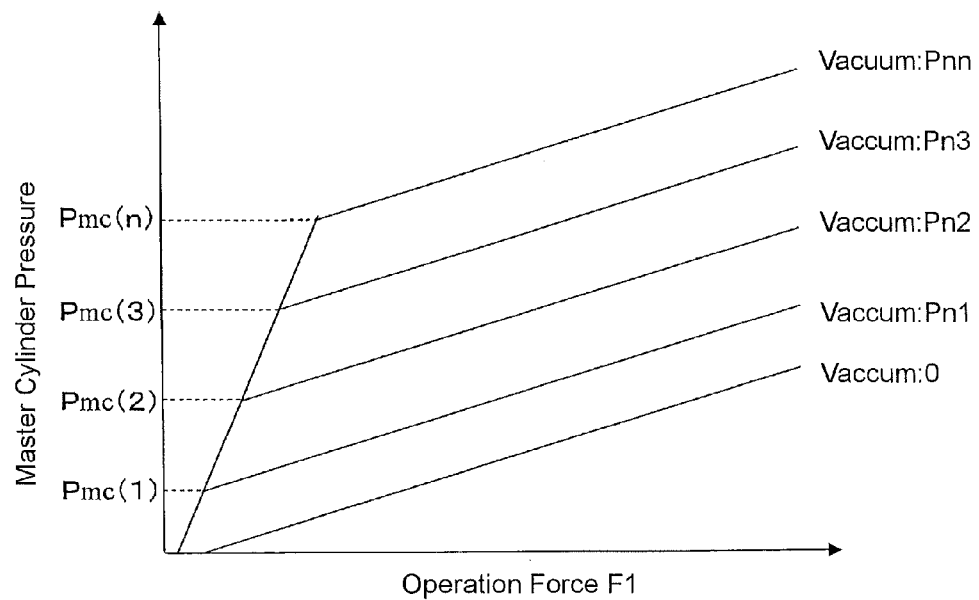
FIG. 6 is a graph (map) showing a relationship between a brake pedal operation force under various vacuum levels and a master cylinder pressure.

The vacuum-boosting limit pressure map memorized in advance in the first memory portion 26c is an initially set map as shown in FIG. 5. The initially set map indicates a designed value and can be obtained by simulation or actual experimental work beforehand. This map can be obtained from a relationship of the operation force F1 relative to the master cylinder pressure Pmc at various vacuum levels as shown in FIG. 6.

When the brake pedal operation forces F1 (pedal depression force) increase to a certain value, the pressure in the atmospheric pressure chamber 22e of the vacuum booster 22 reaches the atmospheric level. Thereafter, even if the brake pedal 21 is kept depressed to introduce the outside air into the atmospheric chamber 22e, any further pressure difference between the vacuum chamber 22d and the atmospheric pressure chamber 22e would be generated. Accordingly, no further boosting force F2 is generated at the power piston 22b. In other words, the vacuum booster 22 outputs total force (F1+F2: the brake pedal operation force F1 and the boosting force F2 generated at the power piston 22b) until the pressure in the atmospheric pressure chamber 22e increases to reach the atmospheric pressure level. After the pressure in the atmospheric chamber 22e reaches the atmospheric pressure, the vacuum booster 22 outputs the increased new pedal operation force F1 and the boosting force F2 at the atmospheric pressure level of the chamber 22e. The point where the pressure in the atmospheric pressure chamber 22e reaches the atmospheric pressure level is the boosting limit of the vacuum booster 22. In other words, the boosting limit means that the vacuum booster 22 has reached the boosting function limit and will not function as the booster. This limit is decided according to the vacuum which is associated with the pressure differential between the atmospheric pressure in the chamber 22e and the vacuum pressure in the chamber 22d.

Accordingly, the boosting limit pressure at every randomly selected vacuum level can be calculated by obtaining a master cylinder pressure corresponding to the boosting limit of the vacuum booster 22 by varying the pedal operation force F1 at the randomly selected vacuum. For example, in the map shown in FIG. 6, supposing that the randomly selected vacuum level is Pnn (the vacuum level is used to decide a target brake pressure according to the brake apparatus of this embodiment), the boosting limit pressure becomes Pmc (n) and when the vacuum level is randomly selected as Pn3 which is a value smaller than Pnn, the boosting limit pressure is Pmc (3). Further, when the randomly selected vacuum is Pn2 which smaller than Pn3, the boosting limit is Pmc (2) and when the vacuum is Pn1 which is smaller than Pn2, the boosting limit is Pmc (1). When the vacuum is zero, the pedal operation force F1 becomes the master cylinder pressure and therefore, no boosting limit exists and no boosting operation exists at every randomly selected pedal operation force F1.

Thus the calculated vacuum level and the boosting limit at that vacuum level can be associated with one on one, and accordingly, from thus associated plural data (vacuum and boosting limit pressure thereof), the map showing relationship between the vacuum and boosting limit pressure can be obtained as shown in FIG. 5. The boosting limit pressure means the master cylinder pressure corresponding to the boosting limit of the vacuum booster 22 by varying the pedal operation force Flat any randomly selected vacuum level.

Back to FIG. 3, the brake control ECU 26 further includes a judgment-use boosting limit pressure calculating portion 26d. The judgment-use boosting limit pressure calculating portion 26d calculates the boosting limit pressure obtained by the vacuum obtained at the vacuum obtaining portion 26a and the vacuum-boosting limit pressure relationship map memorized in the first memory portion 26c and uses the calculated boosting limit pressure as a boosting limit pressure for judgment whether the boosting control shall be started or not, based on the master cylinder pressure.

Further, the brake control ECU 26 includes a boosting control portion 26e (boosting control means) executing the boosting control in which the target brake pressure is supplied to the wheel cylinder WC** according to the brake pedal operation in addition to the master cylinder pressure by driving pumps 44a and 54a when the master cylinder pressure obtained at the master cylinder pressure obtaining portion 26b is equal to or more than the boosting limit pressure calculated at the judgment-use boosting limit pressure calculating portion 26d.

Figure 4:
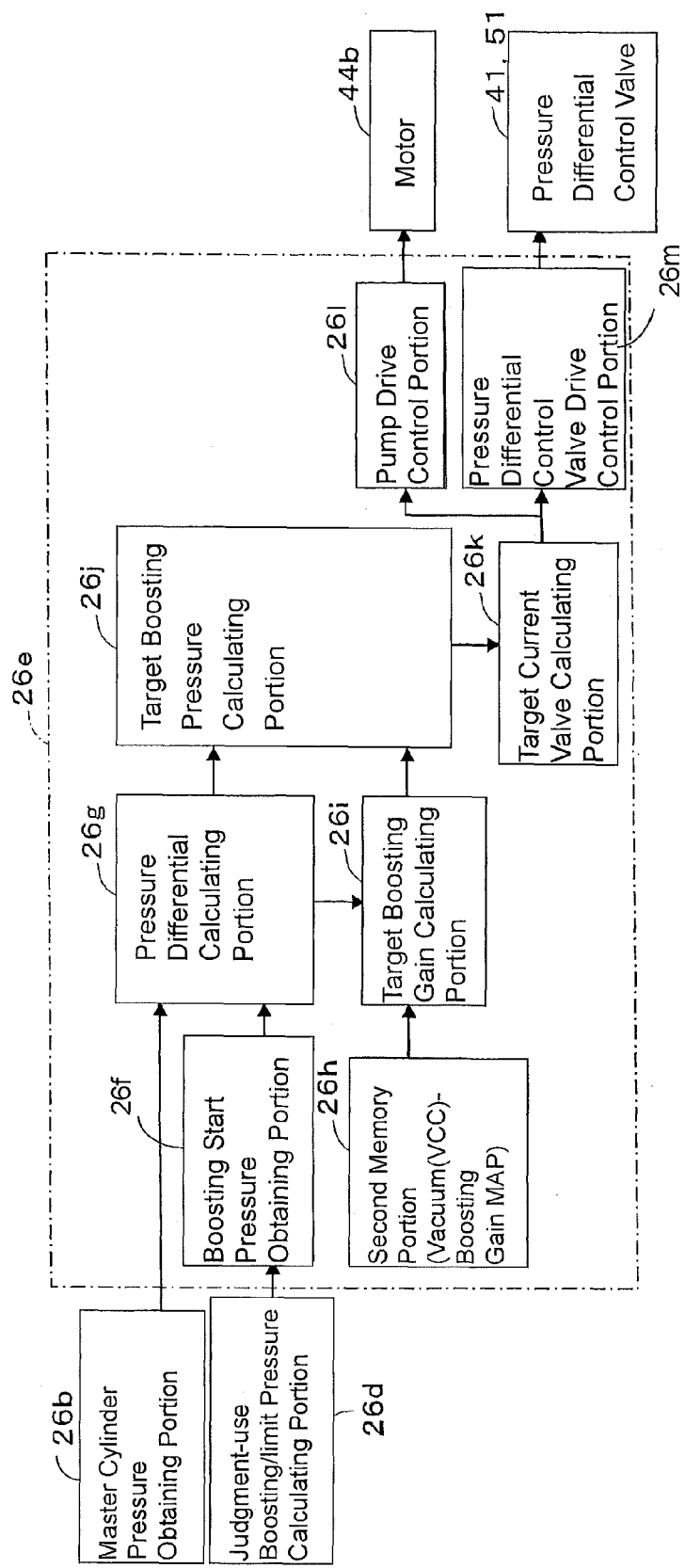
FIG. 4 is a control block diagram showing the structure of boosting control portion of the control device shown in FIG. 3.

As shown in FIG. 4, the boosting control portion 26e includes a boosting start pressure obtaining portion 26f, a pressure differential calculating portion 26g, a second memory portion 26h, a target boosting gain calculating portion 26i, a target boosting pressure calculating portion 26j, a target current value calculating portion 26k, a pump drive control portion 26l and a pressure differential control valve drive control portion 26m.

The boosting start pressure obtaining portion 26f obtains a boosting start pressure Pst by inputting the judgment-use boosting limit pressure calculated at the judgment-use boosting limit pressure calculating portion 26d. The pressure differential calculating portion 26g calculates a pressure differential $\Delta P1$ (Pmc−Pst) which is a pressure difference between the master cylinder pressure Pmc obtained at the master cylinder pressure obtaining portion 26b and the boosting start pressure Pst obtained at the boosting start pressure obtaining portion 26f.

Figure 7:
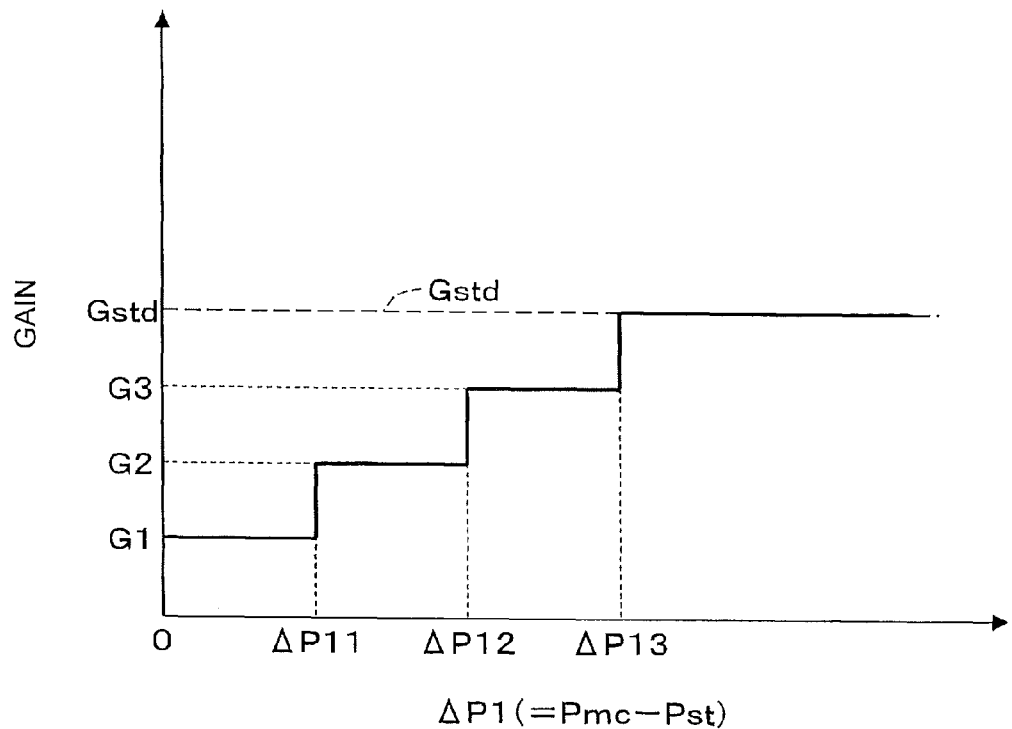
FIG. 7 is a graph (map) showing a differential pressure-boosting gain relationship when the brake pedal depression speed is relatively slow.

The second memory portion 26h memorizes a map or an arithmetic expression for indicating the relationship between the pressure differential $\Delta P1$ and a boosting gain G (pressure differential-boosting gain map). The pressure differential-boosting gain map is memorized in the second memory portion 26h in advance. FIG. 7 shows the relationship between the pressure differential $\Delta P1$ and the gain G. In this relationship, the bigger the pressure differential $\Delta P1$, the bigger the boosting gain G is set. The maximum boosting gain value is set to be a value corresponding to the basic boosting gain value Gstd. The basic boosting gain Gstd is indicated with a broken line in FIG. 7 and is a constant value regardless of the value of the pressure differential $\Delta P1$. The basic boosting gain Gstd indicates a gain which is a servo-ratio of the vacuum booster 22 for a period until the booster reaches the boosting limit. The servo-ratio is a ratio of an output of the vacuum booster 22 relative to the brake pedal depression force. In other words, the ratio of total pressure of basic pressure and the auxiliary pressure relative to the basic pressure. The boosting gain is a ratio (gain) used for calculating the pressure increase amount (boosting pressure amount) from the pressure differential $\Delta P1$. The pressure increase amount is a pressure amount to be added to the boosting start pressure Pst to supply a brake pressure which should have been boosted by the vacuum booster 22 to the wheel cylinder**. This increase pressure amount can be calculated by a mathematical formula (1):

$$\text{Pressure increase amount} = (Pmc - Pst) \times G \quad (1)$$

Wherein, the wheel cylinder pressure can be obtained by adding the pressure increase amount to the boosting start pressure Pst, which is indicated as follow by the formula (2):

$$\text{Wheel cylinder pressure} = Pst + (Pmc - Pst) \times G \quad (2)$$

FIG. 7 shows an example. When the pressure differential $\Delta P1$ is within the range of zero through $\Delta P11$, the gain G is represented as the value of G1 and when the pressure differential $\Delta P1$ is within the range of $\Delta P11$ through $\Delta P12$, the gain G indicates the value G2. When the pressure differential $\Delta P1$ is within the range of $\Delta P12$ through $\Delta P13$, the gain G indicates the value of G3. Further, when the pressure differential $\Delta P1$ is equal to or more than $\Delta P13$, the gain G becomes the basic boosting gain Gstd. The value G1 is set to be the quarter of the basic boosting gain Gstd and accordingly, the value G2 is the half of the value Gstd and the value G3 is three quarters of the value Gstd. The value of each gain G has the following relationship: G1<G2<G3<Gstd. In FIG. 7, horizontal axis indicates the pressure differential $\Delta P1$ and the vertical axis indicates the boosting gain G.

Figure 8:
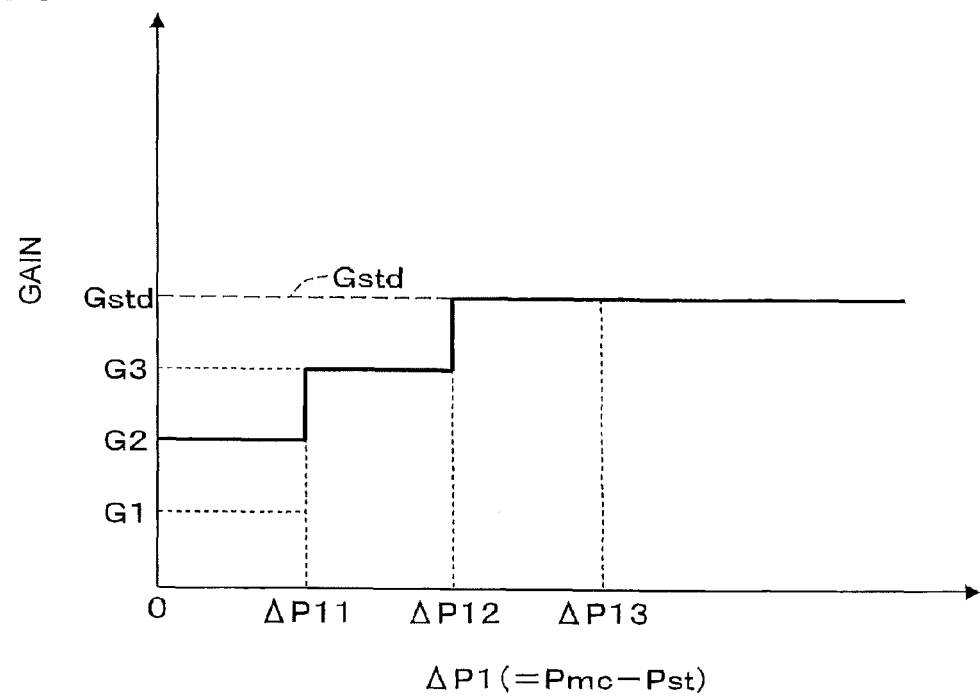
FIG. 8 is a map similar to FIG. 7, but showing the differential pressure-boosting gain relationship when the brake pedal depression speed is faster than that of FIG. 7.

Further, FIG. 8 shows a map for the relationship between the pressure differential and the boosting gain under the condition that the brake pedal 21 (brake operation member) depression speed is relatively high, in other words, the depression speed is equal to or higher than a predetermined value. FIG. 7 shows the map for the relationship between the pressure differential and the boosting gain under the condition that the brake pedal depression speed is lower than the predetermined value. The brake pedal depression speed has a very good correlation with the pressure increase speed of the master cylinder pressure.

As shown in FIG. 8, the boosting gain G indicates a larger value under the same pressure differential value in the map shown in FIG. 7. When the pressure differential $\Delta P1$ is within the range of zero through $\Delta P11$, the gain G shows the value of G2 which is larger than G1 and when the pressure differential ΔP1 is within the range of ΔP11 through ΔP12, the gain G indicates the value of G3 which is larger than G2. When the pressure differential ΔP1 is within the range of ΔP12 through ΔP13, the gain G indicates the value of Gstd which is larger than G3. Further, when the pressure differential ΔP1 is equal to or more than ΔP13, the gain G keeps the basic boosting gain Gstd. In FIG. 8, horizontal axis indicates the pressure differential ΔP1 and the vertical axis indicates the boosting gain G.

As explained, when the brake pedal depression speed is slow (FIG. 7), the pressure differential ΔP1 at which the boosting gain G reaches the basic boosting gain value Gstd is set to be ΔP13. On the other hand, when the brake pedal depression speed is fast, the pressure differential ΔP1 at which the boosting gain G reaches the basic boosting gain value Gstd is ΔP12 which is smaller than the value ΔP13. Accordingly, as will be explained later, a target boosting gain G* is set to return quickly to the basic boosting gain Gstd when the brake pedal depression speed is fast, compared with the case when the pedal depression speed is slower.

The target boosting gain calculating portion 26i calculates the target boosting gain G* corresponding to the pressure differential ΔP1 calculated at the pressure differential calculating portion 26g based on the pressure differential ΔP1 calculated at the pressure differential calculating portion 26g and the pressure differential-boosting gain map. For example, as shown in FIG. 7 When the pressure differential ΔP1 is within the range of zero through ΔP11, the target boosting gain G* shows the value of G1 and when the pressure differential ΔP1 is within the range of ΔP11 through ΔP12, the target boosting gain G* indicates the value of G2. When the pressure differential ΔP1 is within the range of ΔP12 through ΔP13, the target boosting gain G* indicates the value of G3. Further, when the pressure differential ΔP1 is equal to or more than ΔP13, the target boosting gain G* becomes the basic boosting gain Gstd.

The target boosting pressure calculating portion 26j calculates the target boosting pressure Past* based on the target boosting gain G* calculated at the target boosting gain calculating portion 26i and the pressure differential ΔP1 calculated at the pressure differential calculating portion 26g. The target boosting pressure Past* is the control target value for boosting pressure and the boosting pressure is equal to the pressure increase amount and the target boosting pressure Past* can be obtained by the following mathematical formula (3):

$$\text{Target boosting pressure Past*} = (Pmc - Pst) \times G^* = \Delta P1 \times G^* \quad (3)$$

Figure 9:
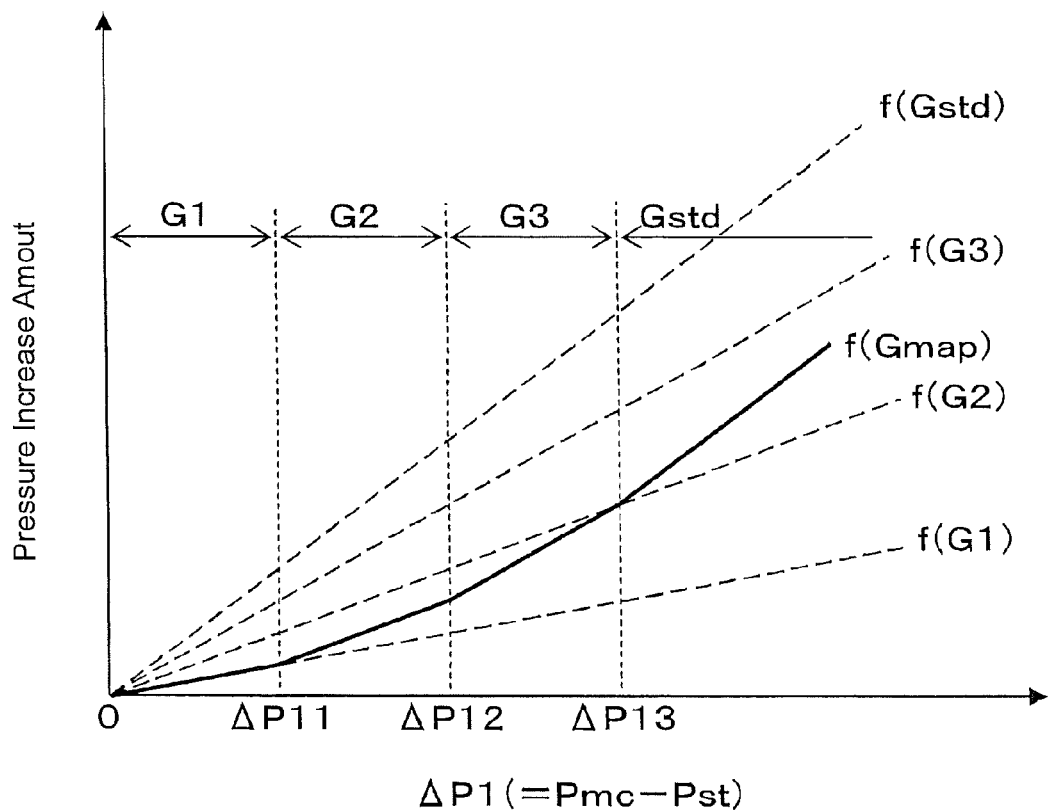
FIG. 9 is a graph (map) showing a pressure increase amount (calculation result) relative to the differential pressure when the brake pedal depression speed is slow.

FIG. 9 shows the relationship (calculation result) between the pressure differential ΔP1 and the target boosting pressure Past* (pressure increase amount). In FIG. 9, calculation results are shown: calculation result f (Gstd) under the target boosting gain G* being constantly the basic boosting gain Gstd, calculation result f (G3) under the target boosting gain G* being constant value of G3, calculation result f (G2) under the target boosting gain G* being constant value of G2 and calculation result f (G1) under the target boosting gain G* being constant value of G1. These results are shown with broken lines in FIG. 9, respectively. The inclinations (gradients) of the results f (G1), f (G2) and f (G3) are one quarter, half and three quarters of the inclination of the result line f (Gstd).

Further, FIG. 9 shows the relationship between the pressure differential ΔP1 and the target boosting pressure Past* (pressure increase amount) calculated by the pressure–boosting gain map shown in FIG. 7 (calculation result: f (Gmap)). This result f (Gmap) is indicated with a solid line in FIG. 9. When the pressure differential ΔP1 is within the range of zero through ΔP11, the target boosting gain G* is the value of G1 and the calculation result f(Gmap) in this range (pressure differential ΔP1 being zero through ΔP11) has the same inclination with the calculation result f(G1). When the pressure differential ΔP1 is between the values of ΔP11 and ΔP12, the target boosting gain G* is the value of G2 and the calculation result f (Gmap) in this range has the same inclination with the calculation result f (G2). When the pressure differential ΔP1 is between the values of ΔP12 and ΔP13, the target boosting gain G* is the value of G3 and the calculation result f (Gmap) in this range has the same inclination with the calculation result f (G3). When the pressure differential ΔP1 is over the value of ΔP13, the target boosting gain G* is the value of Gstd and the calculation result f (Gmap) has the same inclination with the calculation result f (Gstd). The calculation results are successively represented without any intermission one another. Comparing with the case that the target boosting gain G* being constant with respect to the pressure differential ΔP1, the target boosting gain G* is variable with respect to the pressure differential ΔP1 as shown in FIG. 9. Accordingly, the target boosting pressure Past* can be lowered by lowering the target boosting gain G* immediately after the boosting control is started thereby restraining the pressure increase at the time of boosting control operation.

Figure 10:
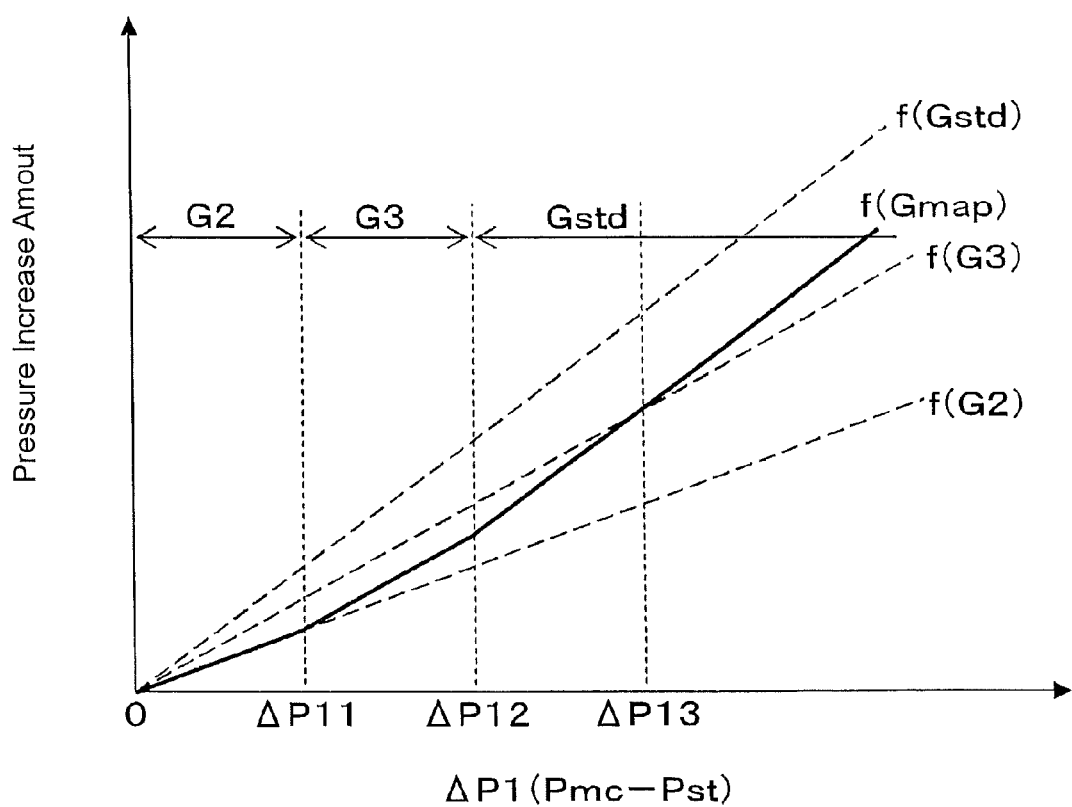
FIG. 10 is a graph (map) similar to FIG. 8, but showing the pressure increase amount (calculation result) relative to the differential pressure when the brake pedal depression speed is fast.

Further, FIG. 10 shows the relationship between the pressure differential ΔP1 and the target boosting pressure Past* (pressure increase amount) calculated by the pressure–boosting gain map shown in FIG. 8 (calculation result: f (Gmap)). This result f (Gmap) is indicated with a solid line in FIG. 10. When the pressure differential ΔP1 is within the range of zero through ΔP11, the target boosting gain G* is the value of G2 and the calculation result f(Gmap) in this range (pressure differential ΔP1 being zero through ΔP11) has the same inclination with the calculation result f(G2). When the pressure differential ΔP1 is between the values of ΔP11 and ΔP12, the target boosting gain G* is the value of G3 and the calculation result f(Gmap) in this range has the same inclination with the calculation result f(G3). When the pressure differential ΔP1 is over the value of ΔP12, the target boosting gain G* is the value of Gstd and the calculation result f (Gmap) has the same inclination with the calculation result f(Gstd). The calculation results are successively represented without any intermission one another.

Comparing with the case that the target boosting gain G* being constant with respect to the pressure differential ΔP1, the target boosting gain G* is set to be variable with respect to the pressure differential ΔP1. Accordingly, the target boosting pressure Past* can be minimized by minimizing the target boosting gain G* immediately after the boosting control is started thereby restraining the pressure increase at the time of boosting control operation. In addition thereto, the target boosting gain G* is set to return quickly to the basic boosting gain Gstd when the brake pedal depression speed is fast, compared with the case when the pedal depression speed is slow.

Referring back to FIG. 4, the target current value calculating portion 26k calculates a current value l to be supplied to a solenoid of the pressure differential 41 (and/or 51) in response to the target boosting pressure Past* calculated at the target boosting pressure calculating portion 26j. The relation between the target boosting pressure Past* and the solenoid current value l is memorized in the ROM in the brake control ECU 26. The solenoid current value l corresponding to the target boosting pressure Past* is determined based on the memorized relation.

The pump drive control portion 26l outputs a drive signal to the motor 44b to drive the pumps 44a, 54a.

The pressure differential control valve drive control portion 26m controls the pressure differential control valve 41 (and/or 51) so that the boosting pressure becomes the target boosting pressure Past* calculated at the target boosting pressure calculating portion 26j. Thus, each wheel cylinder WC** obtains a brake pressure higher than the boosting start pressure Pst by the target boosting pressure Past*.

It is noted here that the target current value calculating portion 26k may be structured to calculate the current value l to be supplied to the motor 44b for the pumps 44a and 54a in response to the target boosting pressure Past* calculated at the target boosting pressure calculating portion 26j. In this case, the pump drive control portion 26l controls the motor 44b so that the boosting pressure becomes the target boosting pressure Past* calculated at the target boosting pressure calculating portion 26j and the pressure differential control valve drive control portion 26m controls the pressure differential control valve 41 (and/or 51) to be in closed position.

Next, the operation of the hydraulic pressure brake apparatus A will be explained with reference to the flowcharts shown in FIGS. 11 through 14.

Figure 11:
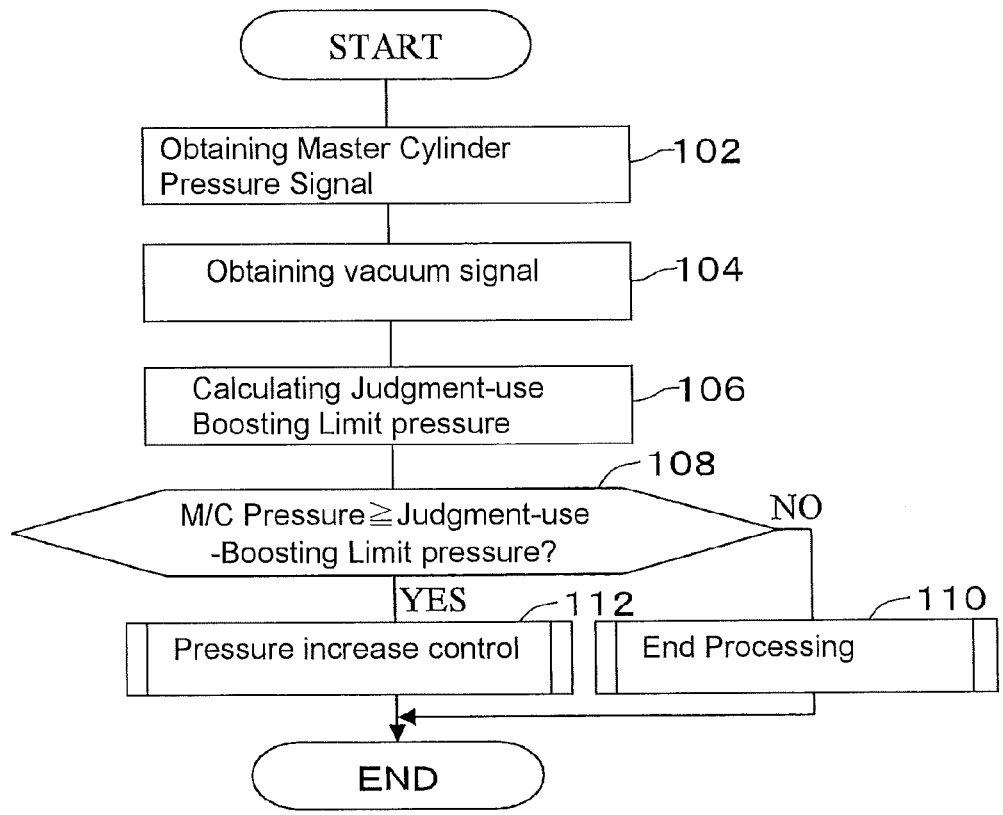
FIG. 11 is a flowchart of a control program (boosting control) to be executed by the control device shown in FIG. 1.
Figure 12:
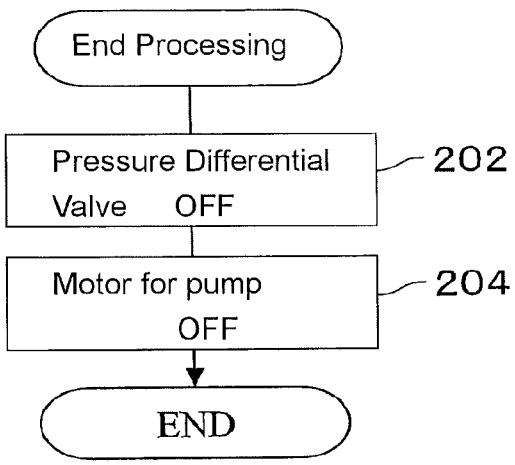
FIG. 12 is a flowchart showing an end processing routine shown in FIG. 11.

In FIG. 11, the brake control ECU 26 executes a program corresponding to the flowcharts every predetermined short period of time (for example, 10 msec) during the ignition switch (not shown) of the vehicle being turned ON. The brake ECU 26 receives a master cylinder pressure signal indicating the master cylinder pressure from the master cylinder pressure sensor 25a1 (step 102) and then receives a vacuum pressure signal indicating the vacuum pressure from the vacuum pressure sensor 22f2 (step 104). Then the brake control ECU 26 calculates the boosting limit pressure as the judgment-use boosting limit pressure which is obtained from the vacuum pressure obtained at the step 104 and the vacuum-boosting limit pressure map memorized in the first memory portion 26c (step 106).

Then the brake control ECU 26 judges whether the vacuum booster 22 is in a boosting operable condition or not (step 108). In detail, the brake control ECU 26 judges that the booster 22 is not in the booting operable condition when the master cylinder pressure obtained in step 106 is equal to or more than the judgment-use boosting limit pressure calculated at the step 106 (judgment "YES"). However, the brake control ECU 26 judges that the booster 22 is in the booting operable condition when the master cylinder pressure obtained in step 106 is less than the judgment-use boosting limit pressure calculated at the step 106 (judgment "NO"). The boosting operable condition means that the vacuum booster 22 can perform boosting operation by means of the vacuum supplied into the booster.

When the vacuum booster 22 is in the boosting operable condition, the brake control ECU 26 judges "NO" at the step 108 and executes the end processing at the step 110. In more detail, the brake control ECU 26 executes the end processing of the pressure increase control (boosting control) according to the sub-routine of the end processing which is shown in the flowchart in FIG. 12. In this sub-routine process, a signal is outputted to turn the solenoid of the pressure differential control valve 41 (and/or 51) OFF, and thereby the pressure differential control valve 41 (and/or 51) is turned off (being open) at step 202. The motor 44b receives a signal to turn the motor OFF and accordingly to stop driving the pump 44a (and/or 54) at step 204. One period of time end processing routine execution ends. This end of the end processing routine also ends one period of time execution of the boosting control routine as shown in FIG. 11. The end processing routine shown in FIG. 12 functions as the end processing of the pressure increase control and in addition thereto, functions as a normal brake processing from the starting of brake pedal 21 depressions up to the boosting limit time. The "normal brake processing" means that the brake pressure is supplied from the master cylinder 23 to the wheel cylinder WC** as it is, with the pressure differential control valve 41 (and/or 51) being open so that no hydraulic pressure difference is generated between the upstream and downstream sides of the pressure differential control valve 41.

On the other hand, when the vacuum booster 22 is not in the boosting operable condition, the brake control ECU 26 judges "YES" at step 108 and executes the boosting control at step 112 (boosting control means). The boosting control is a control in which the brake control ECU 26 drives pumps 44a, 54a and at the same time controls pressure differential control valve 41 (and/or 51) to establish a boosting pressure as a brake pressure and thus supplies the boosting pressure in addition to the master cylinder pressure established in response to the brake pedal depression force to the wheel cylinder WC**, after the master cylinder pressure obtained at the master cylinder pressure obtaining portion (26b, step 102) becomes equal to or more than the boosting limit pressure which is a master cylinder pressure corresponding to the boosting limit of the vacuum booster 22. The brake control ECU 26 drives the pumps 44a, 54a and controls the pressure differential control valve 41 (and/or 51) to obtain the boosting pressure with using the target boosting pressure Past* obtained at the target boosting gain G* which is smaller than the basic boosting gain Gstd, the servo-ratio hitherto of the vacuum booster 22.

Figure 13:
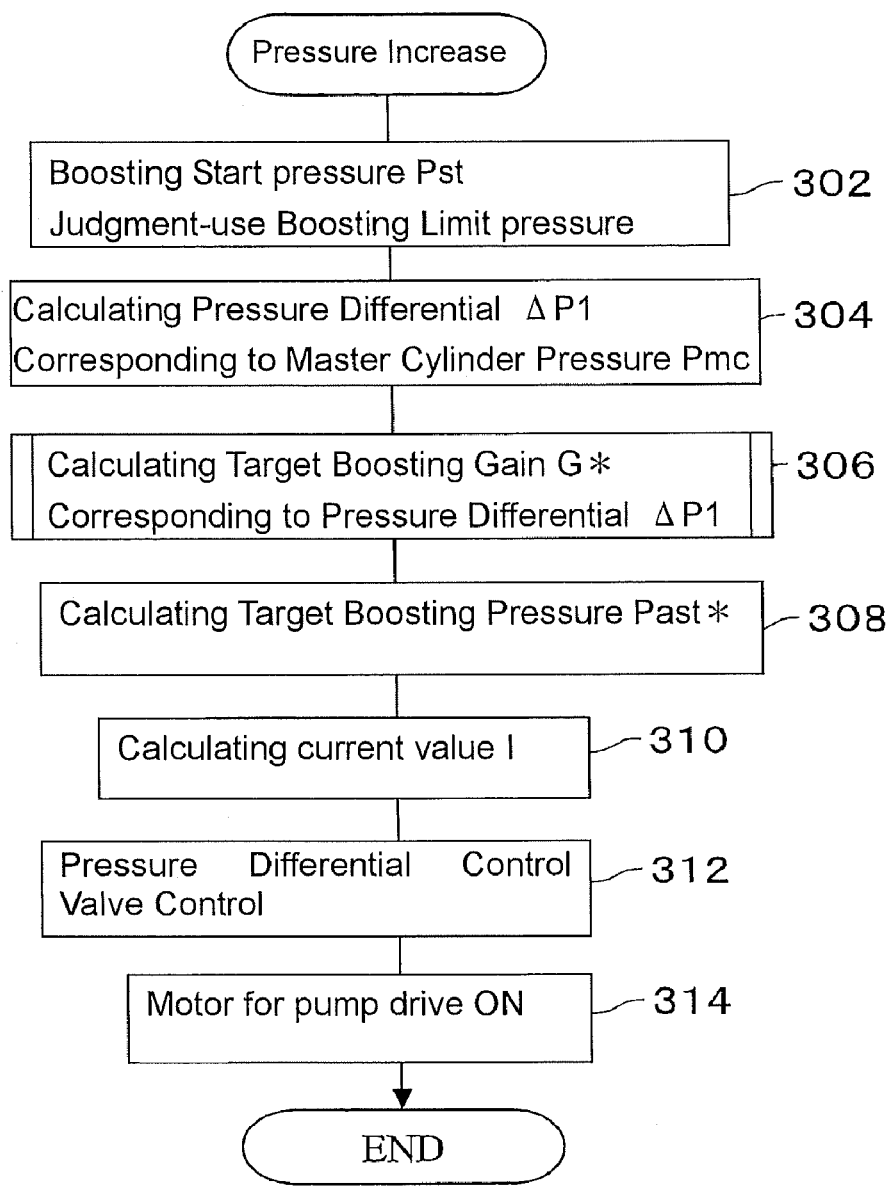
FIG. 13 is a flowchart showing a pressure increase control routine shown in FIG. 11.

In more detail, the brake control ECU 26 executes the boosting control along the pressure increase sub-routine shown in the flowchart of FIG. 13. The brake control ECU 26 reads in the judgment-use boosting limit pressure previously calculated at the step 106 and obtains as a boosting start pressure Pst at the step 302 (boosting start pressure obtaining means). The brake control ECU 26 calculates at the step 304 (pressure differential calculating means) the pressure differential $\Delta P1$ corresponding to the current master cylinder pressure Pmc which has been previously obtained at the step 102. The brake control ECU 26 calculates the pressure differential $\Delta P1$ by deducting the boosting start pressure Pst obtained at the step 302 from the master cylinder pressure Pmc obtained at the step 102 ($\Delta P1 = Pmc - Pst$).

Next, the brake control ECU 26 calculates the target boosting gain G* corresponding to the pressure differential $\Delta P1$ calculated at the step 304 based on the pressure differential $\Delta P1$ calculated at the step 304 and the pressure differential boosting gain map memorized in the second memory portion 26h at the step 306 (target boosting gain calculating means). The brake control ECU 26 executes the target boosting gain calculation processing according to the target boosting gain calculation sub-routine shown in the flowchart of FIG. 14. The target boosting gain is calculated using the pressure differential-boosting gain map under the two cases, one under the brake pedal depression speed (pressure increase speed of master cylinder) being relatively slow and the other under the pedal depression speed being relatively fast.

Figure 14:
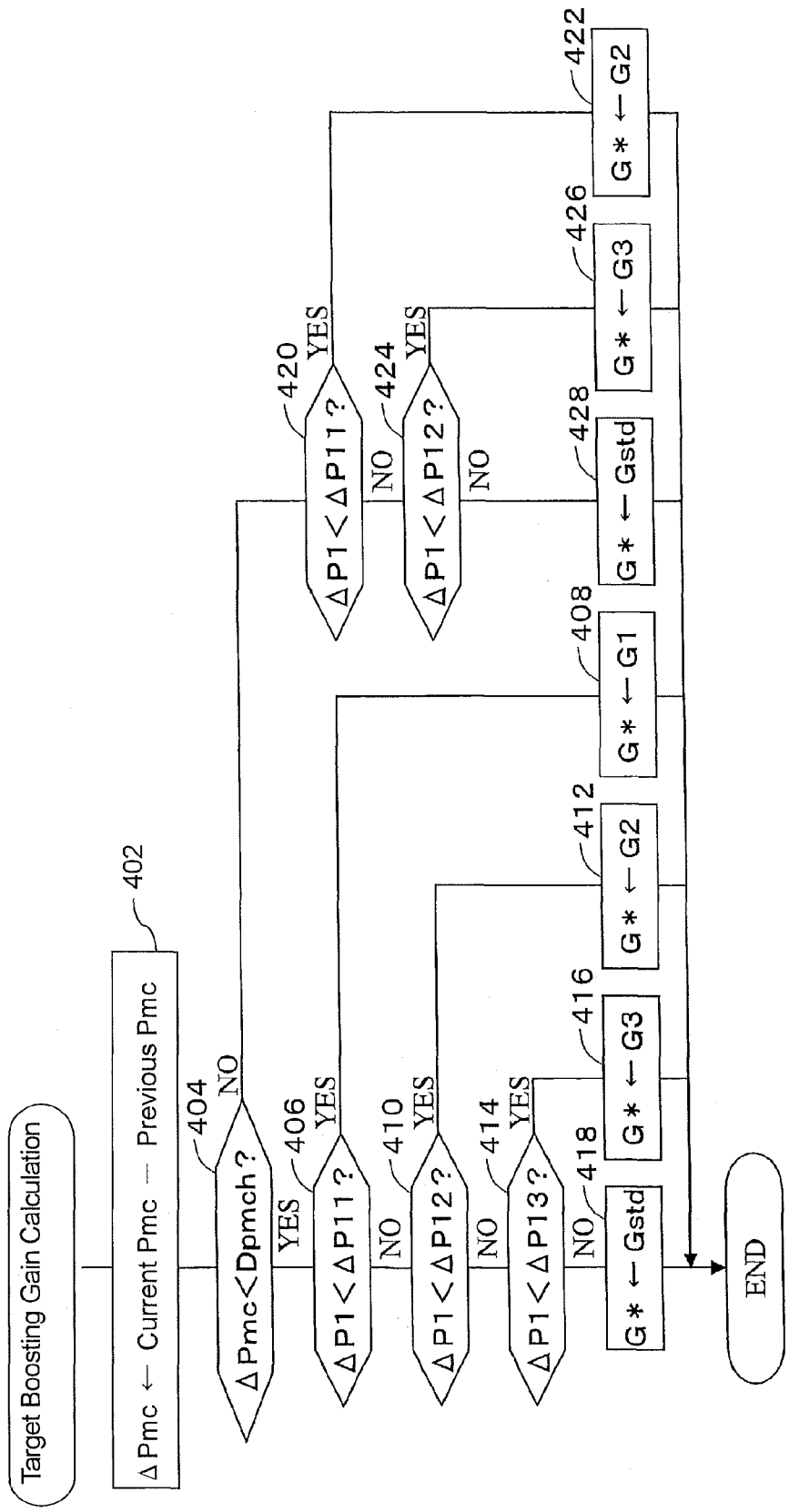
FIG. 14 is a flowchart showing a target boosting gain calculation routine shown in FIG. 13.

The brake control ECU 26 calculates the pressure increase speed of the master cylinder at the step 402 in FIG. 14. The pressure increase speed of master cylinder can be obtained as the value $\Delta Pmc$ which is the pressure deducting the previously obtained master cylinder pressure Pmc from the currently obtained master cylinder pressure Pmc. The brake control ECU 26 judges that the brake pedal depression speed is slow when the pressure increase speed of the master cylinder is smaller than a predetermined value Dpmch and judges the brake pedal depression speed is fast when the pressure increase speed of the master cylinder is larger than the predetermined value Dpmch at the step 404.

When the brake pedal depression speed is judged to be slow, the brake control ECU 26 judges "YES" at the step 404 and calculates the target boosting gain G* using the pressure differential-boosting gain map in FIG. 7. When the pressure differential ΔP1 is in the range between zero and ΔP11, the brake control ECU 26 judges "YES" at the step 406 and calculates the value G1 as the target boosting gain G* (step 408) and when the pressure differential ΔP1 is in the range between ΔP11 and ΔP12, the brake control ECU 26 judges "NO" at the step 406 and "YES" at the step 410 and calculates the value G2 as the target boosting gain G* (step 412). When the pressure differential ΔP1 is in the range between ΔP12 and ΔP13, the brake control ECU 26 judges "NO", "NO" and "YES" at the steps 406, 410 and 414, respectively and calculates the value G3 as the target boosting gain G* (step 416). When the pressure differential ΔP1 is over ΔP13, the brake control ECU 26 judges all "NO"s at the steps 406, 410 and 414, and calculates the value Gstd as the target boosting gain G* (step 418).

When the brake pedal depression speed is judged to be fast, the brake control ECU 26 judges "NO" at the step 404 and calculates the target boosting gain G* using the pressure differential-boosting gain map in FIG. 8. When the pressure differential ΔP1 is in the range between zero and ΔP11, the brake control ECU 26 judges "YES" at the step 420 and calculates the value G2 as the target boosting gain G* (step 422) and when the pressure differential ΔP1 is in the range between ΔP11 and ΔP12, the brake control ECU 26 judges "NO" at the step 420 and "YES" at the step 424 and calculates the value G3 as the target boosting gain G* (step 426). When the pressure differential ΔP1 is over the value of ΔP12, the brake control ECU 26 judges all "NO"s at the steps 420 and 424, and calculates the value Gstd as the target boosting gain G* (step 428).

Next, the brake control ECU 26, in the step 308, calculates the target boosting pressure Past* corresponding to the current master cylinder pressure Pmc using the mathematical formula (3) based on the target boosting gain G* calculated at the step 306 and the pressure differential ΔP1 calculated at the step 304. (target boosting pressure calculating means)

Then, the brake control ECU 26 decides the electric current value l to be supplied to the solenoid of the pressure differential control valve 41 (and/or 51) in response to the decided target boosting pressure Past*. (Step 310 in FIG. 13). Since the relationship between the target boosting pressure Past* and the solenoid current value l is memorized in the ROM of the brake control ECU 26, the solenoid current value l corresponding to the target boosting pressure Past* is decided based on the relationship. Next, the brake control ECU 26 supplies the decided solenoid current value l of the solenoid of the pressure differential control valve 41 (and/or 51) thereby controlling the valve 41 (and/or 51) (controlling the pressure differential) (step 312).

After the control of the pressure differential control valve, the brake control ECU 26 outputs a signal the motor 44b to turn ON (step 314). Then the pump 44a (and/or 54a) pumps up the operational fluid from the regulating reservoir 44c (and/or 54c) to supply the pumped fluid to each wheel cylinder WC. As a result, the brake pressure higher than the master cylinder pressure by the target boosting pressure Past is supplied to the wheel cylinder WC. The one period of time brake pressure increase routine ends, and accordingly, the one period of time boosting control routine shown in FIG. 11** ends.

As explained above, according to the embodiment of the invention, the boosting control means (26e, flowchart in FIG. 11) drives pumps 44a, 54a and at the same time controls pressure differential control valve 41 (and/or 51) to establish a boosting pressure as a brake pressure and thus supplies the boosting pressure in addition to the master cylinder pressure established in response to the brake pedal depression force to the wheel cylinder WC, after the master cylinder pressure obtained at the master cylinder pressure obtaining portion (26b, step 102) becomes equal to or more than the boosting limit pressure which is a master cylinder pressure corresponding to the boosting limit of the vacuum booster 22 at the vacuum obtained by the vacuum pressure obtaining means (26a, step 104). The boosting control means 26 drives the pumps 44a, 54a and controls the pressure differential control valve 41 (and/or 51**) to obtain the boosting pressure with using the target boosting pressure Past* obtained at the target boosting gain G* which is smaller than the basic boosting gain Gstd, the servo-ratio hitherto of the vacuum booster 22.

In the vicinity of the obtained master cylinder pressure which has exceeded the boosting limit pressure, or in other words, immediately after the start of boosting control, the target boosting pressure Past* can be restricted to be small by restricting the value of target boosting gain G*, which leads to the restriction of the pressure increase by boosting control. Accordingly, while a brake operation member (the brake pedal 21) being operated (during vehicle stopping operation), the boosting control can be started with a boosting gain smaller than the boosting gain (basic boosting gain Gstd) which is a boosting gain before the vacuum booster reaches the actual boosting limit even if the boosting control is started before the vacuum booster 22 reaches the actual boosting limit.

Figure 15:
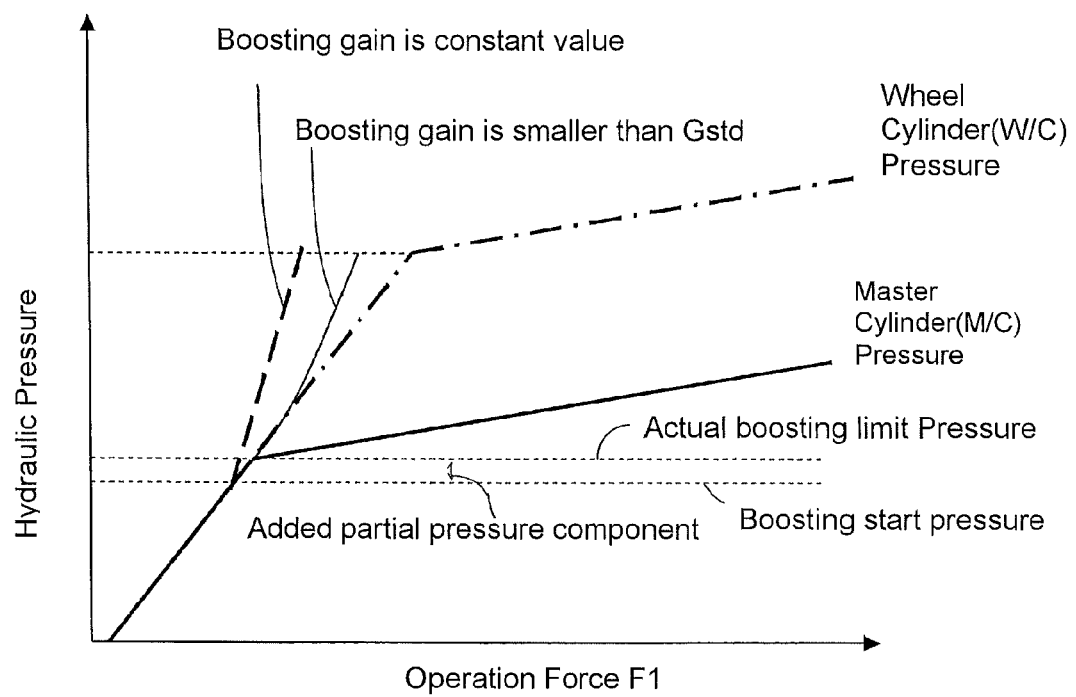
FIG. 15 is a graph showing a relationship between an operation force and various pressure level (master cylinder pressure, wheel cylinder pressure, Pst+(Pmc−Pst)×Gstd, Pst+(Pmc−Pst)×G*), which shows operations and effects of the present invention.

In a conventional method of boosting control, the brake actuator 25 establishes a hydraulic pressure which is a pressure increase amount or a boosting pressure amount from the time immediately after the boosting control started, by multiplying the pressure differential ΔP1 between the boosting start pressure Pst at the time of starting and the master cylinder pressure Pmc by the boosting gain which is the value before the boosting control starts. The established hydraulic pressure is added to the boosting start pressure Pst. Accordingly, if the boosting start pressure Pst is the same value as the actual boosting limit pressure, the pressure differential ΔP1 after the boosting start is the pressure differential based on the actual boosting limit pressure. Thus, a desired wheel cylinder pressure (shown in FIG. 15 with a dot/dash line) can be obtained by adding to the boosting start pressure Pst, the pressure obtained by multiplying the pressure differential by the same boosting limit pressure. On the contrary, if the boosting control is started before the vacuum booster 22 reaches the actual boosting limit, the boosting start pressure Pst is smaller than the actual boosting limit pressure and therefore, the pressure differential ΔP1 immediately after the boosting control start becomes larger than the pressure differential based on the actual boosting limit pressure as is shown in FIG. 15. Therefore, a wheel cylinder pressure larger than the desired pressure is obtained by adding to the boosting start pressure Pst, the pressure obtained by multiplying the pressure differential by the same boosting gain. (shown in FIG. 15 with a broken line).

The reason why the pressure differential ΔP1 immediately after the boosting control start becomes lager than the pressure differential based on the actual boosting limit pressure will be explained hereinafter. The basic boosting gain Gstd is the servo-ratio during the vacuum booster being in the boosting operable condition. Utilizing this relation, the desired wheel cylinder pressure is obtained by adding to the boosting start pressure, the pressure obtained by multiplying the portion of the master cylinder pressure (pressure differential ΔP1) established by the brake pedal 21 depression by the basic boosting gain Gstd even under the vacuum booster being not in the boosting operable condition. However, as shown in FIG. 15, when the boosting control is started before the vacuum booster 22 reaches the actual boosting limit, partial boosting pressure is added to the pressure differential ΔP1 since the partial boosting pressure generated by the vacuum booster is included in the master cylinder pressure in addition to the pressure generated by the brake depression force from immediately after the start of the boosting control.

However, according to the embodiment of the invention, boosting control is performed with a smaller gain (target boosting gain G* calculated at the target boosting gain calculating portion 26i) than the boosting gain before reaching the boosting limit (basic boosting gain Gstd) immediately after the start of the boosting control. Accordingly, comparing the target boosting gain G* being constant with respect to the pressure differential API, the target boosting pressure Past* can be kept small by restricting the gain value G* of the target boosting gain thereby restricting the pressure increase by the boosting control to a smaller value. (FIG. 15 with a fine solid line).

Accordingly, the pressure increase amount by the boosting control can be restricted to a smaller value than the pressure increase amount by the conventional boosting control which has been already become large from the beginning of the boosting control if the boosting control is erroneously started before the vacuum booster 22 actually reaches the boosting limit, caused by production deviations of the vacuum sensor 22f2, master cylinder pressure sensor 25a1 or the vacuum booster 22. This can minimize the influences of the deviations on the sensors and the booster to accurately perform brake operation to obtain any desired braking performance.

Further, the target boosting gain G* used in the boosting control means (26e, the step 112) is set to be large when the pressure differential ΔP1 between the obtained master cylinder pressure and the boosting limit pressure (boosting start pressure Pst) is large. In other words, the larger the pressure differential ΔP1, the larger the target boosting gain G* is set. (FIG. 7 and FIG. 8). Thus the boosting gain is set to be small immediately after the boosting control started (immediately after the pressure differential is established and growing larger from zero condition) and in response to the time elapsed (in response to the increase of the pressure differential), the boosting gain is set to be large. This will improve the braking operation feeling to achieve a smooth braking operation.

Further, the target boosting gain G* used in the boosting control means (26e, step 112) is set to be returned fast to the basic boosting gain value when the depression speed of the brake pedal 21 is fast compared with the case when the brake pedal depression speed is slow. (FIG. 7, FIG. 8 and flowchart in FIG. 14). According to this setting, when the driver rapidly depresses on the brake pedal, such as, for example, upon emergency, the time from the boosting start to the time of reaching the basic boosting gain becomes shortened to increase the pressure to quickly obtain the brake force necessary for the emergency braking. If the brake pedal is depressed fast, the boosting limit may be reduced. However, it is useful to early return the boosting gain G to the basic boosting gain Gstd to maintain the brake force under such case.

The maximum target boosting gain G* used in the boosting control means (26e and step 112) is set to be the basic boosting gain Gstd. Then after the boosting gain reached to the boosting limit, an unnecessary increase may be restricted comparing with the case when the boosting gain does not reach the limit value.

Although the embodiment indicates the two cases for calculating the target boosting gain G*, one case under the brake pedal depression speed is fast and the other case under the brake pedal depression speed is slow, using the respective maps. However, a three dimensional map indicating the pressure differential-boosting gain per brake pedal depression speed.

According to the structure of the embodiment of the invention, in the vicinity of the obtained master cylinder pressure which has exceeded the boosting limit pressure, or in other words, immediately after the start of boosting control, the target boosting pressure Past* can be restricted to be small by restricting the value of target boosting gain G*, which leads to the restriction of the pressure increase by boosting control. Accordingly, during a brake pedal operation (during vehicle stopping operation) the boosting control can be started with a boosting gain smaller than the basic boosting gain Gstd which is a boosting gain before the vacuum booster reaches the actual boosting limit even if the boosting control is started before the vacuum booster 22 reaches the actual boosting limit.

According to the control device 26 of the embodiment of the invention, the target boosting gain G* used in the boosting control means (26e, step 306 in a flowchart in FIG. 13) is set to become larger when the pressure differential ΔP1 between the obtained master cylinder pressure Pmc and the boosting limit pressure becomes larger. (Pressure differential-boosting gain map in FIG. 7).

Thus the boosting gain is set to be small immediately after the boosting control started (immediately after the pressure differential is established and growing larger from zero condition) and in response to the time elapsed (in response to the increase of the pressure differential), the boosting gain is set to be large. This will improve the braking operation feeling to achieve a smooth braking operation.

According to the control device 26 of the embodiment of the invention, the target boosting gain G* used in the boosting control means 26e is set quickly returns to the basic boosting gain Gstd when an operation speed of the brake operation member 21 is fast, quicker than a case when the operation speed of the brake operation member 21 is slow. (Pressure differential-boosting gain map respectively shown in FIG. 7 and FIG. 8).

According to this setting, when the driver rapidly depresses on the brake pedal 21, such as, for example, upon emergency, the time from the boosting start to the time of reaching the basic boosting gain Gstd becomes shortened to increase the pressure rapidly to quickly obtain the brake force necessary for the emergency braking.

According to the control device 26 of the embodiment of the invention, a maximum value of the target boosting gain G* used in the boosting control means 26e is set to agree to the basic boosting gain. (pressure differential-boosting gain map respectively shown in FIG. 7 and FIG. 8).

The maximum target boosting gain G* used in the boosting control means (26e and step 112) is set to be the basic boosting gain. Then after the boosting gain has reached the boosting limit, an unnecessary increase may be restricted, comparing with the case when the boosting gain does not reach the limit value.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A control device (26) adapted to a vehicle brake apparatus (A) equipped with:
    a master cylinder (23) for establishing a hydraulic brake pressure in response to an operation of a brake operation member (21);
    a vacuum booster (22) boosting an operation force of the brake operation member by using a vacuum supplied thereto and outputting a boosting force to the master cylinder;
    a wheel cylinder (WC) applying a braking force to a wheel (W) of a vehicle (M) upon supply of the hydraulic brake pressure from the master cylinder;
    a pressure differential control valve (41, 51) provided in a hydraulic pressure passage (25a, 25b) connecting the master cylinder and the wheel cylinder for controlling a wheel cylinder side hydraulic pressure to be higher than a master cylinder side hydraulic pressure by a controlled pressure differential amount;
    a hydraulic pressure pump (44a, 54a) connected to the hydraulic pressure passage (25a, 25b) connecting the master cylinder and the wheel cylinder for establishing a hydraulic brake pressure upon receipt of an output from an electric motor and supplying the established hydraulic brake pressure to the wheel cylinder, independently of the hydraulic brake pressure established by the master cylinder;
    a vacuum detecting means (22f2) for detecting the vacuum supplied to the vacuum booster (22); and
    a master cylinder pressure detecting means (25a1) for detecting the master cylinder pressure, the control device (26) comprising:
    a vacuum pressure obtaining means (26a, step 104) obtaining the vacuum supplied to the vacuum booster by means of the vacuum detecting means;
    a master cylinder pressure obtaining means (26b, step 102) for obtaining the master cylinder pressure by means of the master cylinder pressure detecting means; and
    a boosting control means (26e, step 306 in a flowchart in FIG. 13) establishing a boosting pressure as an additional hydraulic brake pressure and supplying the boosting pressure to the wheel cylinder, in addition to the master cylinder pressure established in response to the operation of the brake operation member, whereby the hydraulic pressure pump and the pressure differential control valve are controlled from the time when the master cylinder pressure obtained by the master cylinder pressure obtaining means has reached a value equal to or more than a boosting limit pressure which is a master cylinder pressure corresponding to a boosting limit of the vacuum booster at the vacuum obtained by the vacuum pressure obtaining means so that the boosting pressure agrees to a target boosting pressure obtained with a target boosting gain which is smaller than a basic boosting gain corresponding to a servo-ratio of the vacuum booster for a period until the vacuum booster reaches the boosting limit.

2. The control device adapted to the brake apparatus according to claim 1, wherein the target boosting gain used in the boosting control means is set to become large when the pressure differential between the obtained master cylinder pressure and the boosting limit pressure becomes large (pressure differential-boosting gain map in FIG. 7).

3. The control device adapted to the brake apparatus according to claim 2, wherein a maximum value of the target boosting gain used in the boosting control means is set to agree to the basic boosting gain (pressure differential-boosting gain map respectively shown in FIG. 7 and FIG. 8).

4. The control device adapted to the brake apparatus according to claim 1, wherein the target boosting gain used in the boosting control means is set to quickly returns to the basic boosting gain when an operation speed of the brake operation member is fast, quicker than the case when the operation speed of the brake operation member is slow (pressure differential-boosting gain map respectively shown in FIG. 7 and FIG. 8).

5. The control device adapted to the brake apparatus according to claim 4, wherein a maximum value of the target boosting gain used in the boosting control means is set to agree to the basic boosting gain (pressure differential-boosting gain map respectively shown in FIG. 7 and FIG. 8).

6. The control device adapted to the brake apparatus according to claim 1, wherein a maximum value of the target boosting gain used in the boosting control means is set to agree to the basic boosting gain (pressure differential-boosting gain map respectively shown in FIG. 7 and FIG. 8).

* * * * *